(12) United States Patent
Muta et al.

(10) Patent No.: US 11,226,635 B2
(45) Date of Patent: Jan. 18, 2022

(54) MOVING BODY SYSTEM AND OPERATION CONTROL METHOD

(71) Applicant: TOYOTA JIDOSHA KABUSHIKI KAISHA, Toyota (JP)

(72) Inventors: Takahiro Muta, Mishima (JP); Eisuke Ando, Nagoya (JP); Takao Hishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 446 days.

(21) Appl. No.: 16/271,036

(22) Filed: Feb. 8, 2019

(65) Prior Publication Data

US 2019/0250633 A1    Aug. 15, 2019

(30) Foreign Application Priority Data

Feb. 15, 2018    (JP) .............................. JP2018-024906

(51) Int. Cl.
 *G05D 1/02* (2020.01)
 *G06Q 10/10* (2012.01)
 *G06Q 10/06* (2012.01)

(52) U.S. Cl.
 CPC ........... *G05D 1/0276* (2013.01); *G05D 1/021* (2013.01); *G05D 1/0287* (2013.01); *G06Q 10/06315* (2013.01); *G06Q 10/1095* (2013.01); *G05D 2201/0211* (2013.01)

(58) Field of Classification Search
 CPC .... G05D 1/0276; G05D 1/0287; G05D 1/021; G05D 2201/0211; G06Q 10/06315; G06Q 10/1095; G06Q 10/06311–063114; G01C 21/3617; G01C 21/3438
 USPC .......................................................... 701/24
 See application file for complete search history.

(56) References Cited

U.S. PATENT DOCUMENTS

2019/0178656 A1*   6/2019   Stegall ................... G08G 1/202

FOREIGN PATENT DOCUMENTS

| DE | 102016222006 A1 * | 5/2018 | ........... G01C 21/343 |
| JP | H09-183334 A | 7/1997 | |
| JP | 2005157422 A * | 6/2005 | |

* cited by examiner

*Primary Examiner* — Krishnan Ramesh
(74) *Attorney, Agent, or Firm* — Oliff PLC

(57) ABSTRACT

A moving body system for controlling operation of moving bodies comprises an accepter configured to accept utilization requests for requesting utilization of the moving bodies corresponding to respective users in order that the plurality of users gather by using the moving bodies corresponding to the respective users; an acquirer configured to acquire scheduled working times of the respective users in the moving bodies when the respective users move by the moving bodies corresponding thereto respectively; and a determiner configured to determine a meeting place at which the respective users gather, the determiner determining the meeting place so that the meeting place gets closer to a getting-on position of the user who has the scheduled working time shorter than that of the other user or those of the other users.

10 Claims, 10 Drawing Sheets

| MOVING BODY ID | PRESENT POSITION | MOBILE SERVICE |
|---|---|---|
| V001 | P10 | NOT IN MIDDLE OF SERVICE |
| V002 | P20 | NOT IN MIDDLE OF SERVICE |
| V003 | P30 | IN MIDDLE OF SERVICE |
| V004 | P40 | NOT IN MIDDLE OF SERVICE |
| V005 | P50 | NOT IN MIDDLE OF SERVICE |

FIG. 4

| GATHERING MANAGEMENT ID | NAME | DATE AND TIME OF GATHERING | MANAGEMENT USER | MEETING PLACE |
|---|---|---|---|---|
| M01 | REGULAR CONFERENCE | 2018/X1/Y1 10:00 | U001 | S10 |
| M02 | XX COMPANY VISITATION | 2018/X2/Y2 14:00 | U013 | S20 |
| M03 | | | | |

FIG. 5

| GATHERING MANAGEMENT ID | USER ID | GETTING-ON POSITION | SCHEDULED WORKING TIME | MOVING BODY ID |
|---|---|---|---|---|
| M01 | U001 | P1 | 1.5 | V001 |
| M01 | U002 | P2 | 0.5 | V002 |
| M01 | U003 | P3 | 1.0 | V004 |
| M02 | U012 | P4 | 1.0 | V005 |
| M02 | U013 | P5 | 1.0 | V006 |

FIG. 6

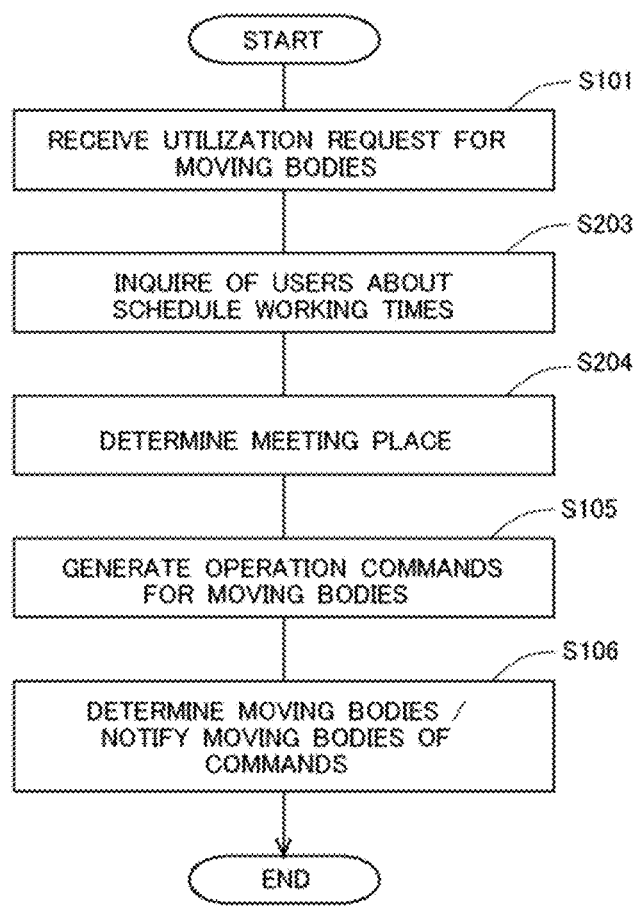

MOVING BODY SYSTEM AND OPERATION CONTROL METHOD

CROSS REFERENCE TO RELATED APPLICATION

This application claims the benefit of Japanese Patent Application No. 2018-024906, filed on Feb. 15, 2018, which is hereby incorporated by reference herein in its entirety.

BACKGROUND

Technical Field

The present disclosure relates to a moving body system and an operation control method.

Description of the Related Art

In general, the vehicle is used in order that a user moves to a desired destination and/or the vehicle is used in order to transport a cargo to a desired delivery destination. Further, such a form is also conceived that the space in the vehicle is used as a space for a user to perform a predetermined working. For example, Patent Document 1 discloses a mobile office which is constructed such that pieces of equipment for business use are arranged usably in vehicles, and the plurality of vehicles are connected to one another. The plurality of vehicles are connected to a connecting vehicle which is provided in order to connect the vehicles. Thus, people can come and go between the vehicles via the connecting vehicle, and an office space, which has an extent as required, is provided. Further, a vehicle, which is arranged with at least one of a power generation apparatus, an air conditioning apparatus, a bathroom, a toilet, and pieces of kitchen equipment, is connected to the connecting vehicle, and thus the comfortability or liveability of the office is enhanced. Note that the mobile office of Patent Document 1 is constructed such that a plurality of vehicles and a connecting vehicle are gathered at a predetermined place, and they are connected to one another at the place.

PRECEDING TECHNICAL DOCUMENT

Patent Document

[Patent Document 1]
Japanese Patent Application Laid-Open No. 9-183334

SUMMARY

In general, the user executes his/her own work at a place including, for example, an office which is ordinarily used, an office which is provisionally used in the business trip or the like, and a mobile office. On this account, if a plurality of users gather at a predetermined meeting place (gathering place) on account of a meeting (conference) or the like, the situation, which includes, for example, the time (traveling time or transit time) required to move to the meeting place and the time required to prepare the conference or the like, differs variously depending on the user. Therefore, if a halfway point (way point) of the places at which the respective uses execute the works is set as the meeting place, it is assumed that overs and shorts appear for some uses in relation to the time required for the preparation until the conference begins. However, any sufficient proposal has not been made in order to improve the work efficiencies during the traveling times of the users while considering the situations of the works of the respective users who gather at the predetermined meeting place.

The present disclosure has been made in order to solve the problem as described above, an object of which is to provide a technique for respective users to efficiently utilize the traveling times in order to execute works if the plurality of users move to a meeting place.

In order to solve the problem described above, the present applicant has conceived that when a plurality of users move by moving bodies corresponding thereto respectively, a meeting place is determined so that the meeting place gets closer to a getting-on position of the user who has a scheduled working time in the moving body shorter than that of the other user or those of the other users. When the meeting place is determined as described above, the respective users can thereby efficiently utilize the traveling times for executing the works.

In particular, the present disclosure resides in a moving body system for controlling operation of moving bodies; the moving body system may comprising an accepter configured to accept utilization requests for requesting utilization of the moving bodies corresponding to respective users in order that the plurality of users gather by using the moving bodies corresponding to the respective users; an acquirer configured to acquire scheduled working times of the respective users in the moving bodies when the respective users move by the moving bodies corresponding thereto respectively; and a determiner configured to determine a meeting place at which the respective users gather, the determiner determining the meeting place so that the meeting place gets closer to a getting-on position of the user who has the scheduled working time shorter than that of the other user or those of the other users.

The moving body system of the present disclosure is the system which determines the meeting place (gathering place) depending on the scheduled working times of the plurality of users so as to improve the work efficiencies of the respective users in the traveling times until arrival at the meeting place in the moving bodies. The scheduled working time is the working time which is assumed to be required for the work intended to be executed in the moving body during the period until each of the users moves to the meeting place. The scheduled working time can be, for example, a time which is designated by the user himself/herself. The meeting place is, for example, the place which is provided in order that the plurality of users gather to hold a conference (meeting) or the like. Further, the getting-on position is the position at which each of the users gets on the moving body in order to move to the meeting place. The moving body system may be notified of the getting-on position together with the utilization request for the moving body. Each of the users can start the preparatory working for the conference or the like after getting on the moving body at the getting-on position. Therefore, the meeting place is determined so that the traveling time, which is required to move from the getting-on position to the meeting place, is longer than the scheduled working time. If the moving body system accepts the utilization request, then the moving body system determines the meeting place at which the respective users gather, and the moving body system allocates the moving body to the getting-on position of each of the users. Each of the users can perform the preparatory working for the conference or the like to be held at the meeting place, in the moving body which moves from the getting-on position to the meeting place. Note that each of the users can also continue, in the moving body, the work or any other working having been executed before each of the users gets on the moving body.

The moving body system may compare the scheduled working times of the respective users with each other to determine the meeting place so that the meeting place gets closer to the getting-on position of the user who has the scheduled working time shorter than that of the other user or those of the other users. The moving body system may determine the meeting place, for example, such that the distance, which extends to the getting-on position of the user having the scheduled working time shorter than that of the other user or those of the other users, is shorter than the distances which extend to the getting-on positions of the other users. Accordingly, the moving body system can suppress overs and shorts of the working times until the respective users move to the meeting place, and the moving body system can efficiently utilize the traveling times for executing the works of the respective users.

In this context, in the moving body system described above, the determiner may determine the meeting place on the basis of a predetermined point which is decided based on the getting-on positions for the respective users to get on the moving bodies so that the meeting place is located at a position at which the meeting place gets closer to the getting-on position of a first user as compared with the predetermined point in relation to the first user who is included in the plurality of users and who has the shortest scheduled working time, and the meeting place is located at the position at which the meeting place becomes more distant from the getting-on position of a second user as compared with the predetermined point in relation to the second user who is included in the plurality of users and who has the longest scheduled working time.

The predetermined point can be, for example, a halfway point of the respective getting-on positions in relation to the plurality of users who gather. Further, the predetermined point may be a central point between the getting-on position of the first user and the getting-on position of the second user. Then, on the basis of the predetermined point, the meeting place gets closer to the getting-on position of the first user who has the shortest scheduled working time, and the meeting place becomes more distant from the getting-on position of the second user who has the longest scheduled working time. Thus, in the moving body system, it is possible to suppress overs and shorts of the working times until the first user and the second user move to the meeting place. Therefore, the respective users can efficiently utilize the traveling times until arrival at the meeting place, for executing the works.

Further, in the moving body system described above, the determiner may determine the meeting place assuming that the scheduled working time of one user is longer than the scheduled working time of the other user of the plurality of users or the scheduled working times of the other users of the plurality of users, if the acquirer acquires the scheduled working time of the one user of the plurality of users together with the utilization request. In this case, even if the scheduled working time of only one user is acquired, the moving body system can determine the meeting place so that the traveling time of the concerning user is longer than that of the other user or those of the other users. The moving body system can determine the meeting place without acquiring the scheduled working time of the other user or the scheduled working times of the other users, by acquiring the scheduled working time of the user who intends to secure the longer working time, for example, the user who organizes the conference. Further, it is enough to designate the scheduled working time of one user. Therefore, the procedure for the utilization request is simplified.

Further, in the moving body system described above, the acquirer may acquire the scheduled working times of the respective users by making inquiries about the scheduled working times with respect to the respective users relevant to the utilization request. The acquirer acquires the scheduled working times of the respective users, and thus the determiner can determine the meeting place on the basis of the scheduled working times of the respective users. Therefore, the moving body system can further suppress overs and shorts of the working time in relation to each of the users.

Further, in the moving body system described above, the acquirer may acquire the scheduled working times of the respective users by estimating the scheduled working times of the respective users on the basis of attribute information of the respective users relevant to the utilization request. The attribute information is the attribute to be used to estimate the working time, including, for example, the years of experience of the work, whether or not the user is an organizer of the conference, and the history of actual working times in the past during the traveling or movement by the moving body system. The moving body system can estimate the scheduled working time, for example, by defining the coefficient corresponding to the value of each attribute, and multiplying the coefficient by the working time which serves as the basis or reference. The working time, which serves as the basis or reference, is the working time which is previously defined depending on the content (classification) of the working of the user in the moving body. The scheduled working time is estimated on the basis of the attribute information of each of the users, unlike a case in which the user designates the scheduled working time of each of the user. Therefore, the moving body system can determine the meeting place on the basis of the scheduled working time which more conforms to the actual circumstances.

Further, in the moving body system described above, the determiner may determine the meeting place on the basis of the scheduled working times of the predetermined users who are included in the plurality of users and from whom the users having the scheduled working times acquired by the acquirer shorter than a predetermined time are excluded. The predetermined time can be defined, for example, as a half of the scheduled working time which is the longest of those of the respective users. In this case, the moving body system can determine the meeting place while preferentially considering the working times of the users having the scheduled working times of not less than the predetermined time.

In this context, in the moving body system described above, the moving body may be an autonomous moving vehicle which autonomously moves toward the meeting place without being driven by each of the users, in accordance with a movement command to move to the meeting place determined by the determiner. When the user moves by the moving body which is the autonomous moving vehicle, even if the user singly gets on the moving body, then it is unnecessary for the user himself/herself to drive the moving body. Therefore, the user can consume the traveling time for Note that the moving body system of the present disclosure may be composed of one or a plurality of processing apparatus or processing apparatuses such as a computer or computers or the like. When the moving body system is composed of the plurality of processing apparatuses, the respective configurations of the moving body system are provided in a dispersed or decentralized manner in the plurality of processing apparatuses, and the respective processing apparatuses cooperate to realize the processing as the moving body system. Further, the moving body system of the present disclosure may be formed on the computer provided for the moving body, or the moving body system of the present disclosure may be formed outside the moving body.

The present disclosure can be also grasped from an aspect of an operation control method for controlling operation of moving bodies. The operation control method may comprise a step of accepting utilization requests for requesting utilization of the moving bodies corresponding to respective users in order that the plurality of users gather by using the moving bodies corresponding to the respective users; a step of acquiring scheduled working times of the respective users in the moving bodies when the respective users move by the moving bodies corresponding thereto respectively; and a step of determining a meeting place at which the respective users gather, the meeting place being determined so that the meeting place gets closer to a getting-on position of the user who has the scheduled working time shorter than that of the other user or those of the other users. Note that the technical concept, which is disclosed in relation to the moving body system described above, can be also applied to the operation control method within a range in which any technical inconsistency does not occur.

Further, in the operation control method described above, in the determining step, the meeting place may be determined on the basis of a predetermined point which is decided based on the getting-on positions for the respective users to get on the moving bodies so that the meeting place is located at a position at which the meeting place gets closer to the getting-on position of a first user as compared with the predetermined point in relation to the first user who is included in the plurality of users and who has the shortest scheduled working time, and the meeting place is located at the position at which the meeting place becomes more distant from the getting-on position of a second user as compared with the predetermined point in relation to the second user who is included in the plurality of users and who has the longest scheduled working time.

According to the present disclosure, it is possible to provide the technique for the respective users to efficiently utilize the traveling times in order to execute the works if the plurality of users moves to the meeting place.

BRIEF DESCRIPTION OF THE DRAWINGS

FIG. 4 exemplifies a data structure of moving body management information stored in the management server.

FIG. 5 exemplifies a data structure of gathering management information stored in the management server.

FIG. 6 exemplifies a data structure of gathering user information stored in the management server.

FIG. 10 illustrates a flow chart exemplifying an operation control process according to a second modified embodiment.

DESCRIPTION OF THE EMBODIMENTS

An explanation will be made below on the basis of the drawings about a specified embodiment of the present disclosure. The configuration, which is described in the embodiment of the present disclosure, is not intended to limit the technical scope of the disclosure only thereto, unless specifically noted.

Embodiment

<System Configuration>

Figure 1:
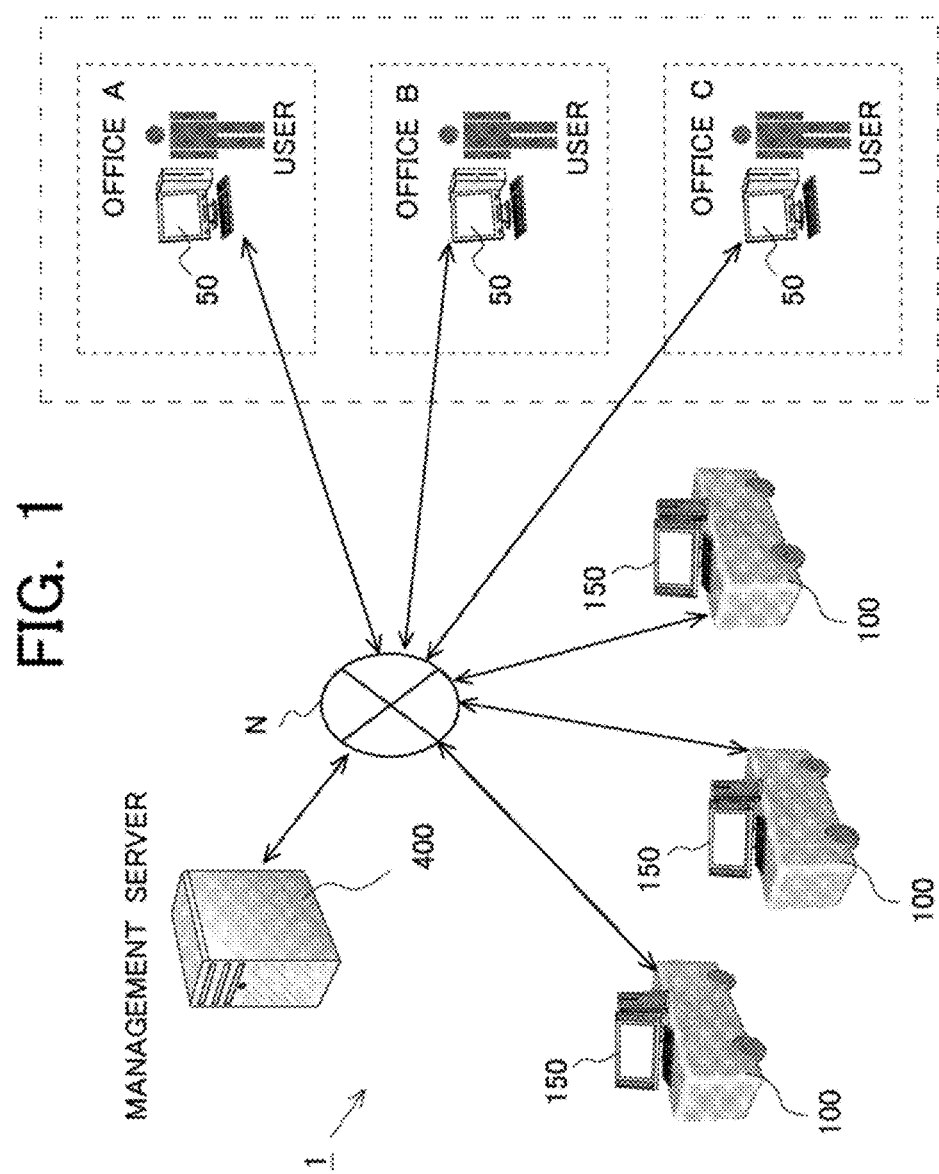
FIG. 1 exemplifies a schematic arrangement of a moving body system to which the moving body system according to the present disclosure is applied.

FIG. 1 exemplifies a schematic arrangement of a moving body system according to this embodiment. At first, the outline of the moving body system 1 will be explained. The moving body system 1 is constructed to include a management server 400 and a plurality of moving bodies 100. The moving body 100 is an autonomous traveling vehicle which performs the autonomous traveling on the basis of a given command, and the moving body 100 provides a predetermined service. The management server 400 is an apparatus which manages the plurality of moving bodies 100, and the management server 400 issues the command given to the moving body 100. A user terminal 50, which is possessed by each of users who utilize the moving body system 1, is shown in the drawing as the construction relevant to the moving body system 1.

The moving body system 1 accepts utilization requests for utilizing the moving bodies 100 from the user terminal or user terminals 50 when the plurality of users gather. The moving body system 1 may accept the utilization requests in relation to the plurality of users from the user terminal 50 of one user, or the moving body system 1 may accepts the utilization requests from the respective user terminals of the plurality of users. The moving body system 1 determines a meeting place (gathering place) at which the plurality of users gather, and the moving body system 1 allocates the moving bodies 100 to the respective users. The moving body system 1 transmits the command so that the corresponding user is to be transported to the meeting place, with respect to the allocated moving body 100. The moving body 100 is a multipurpose moving body in which the function possessed thereby can be changed for each individual, and the moving body 100 is a moving body which autonomously travels on the road. The moving body 100, which is utilized in the moving body system 1, has an object to move the user to a predetermined destination in accordance with the utilization request of the user. The predetermined destination is, for example, the meeting place at which the plurality of users gathers for the purpose of a conference or in order to visit a customer or client. The moving body system 1 determines the meeting place on the basis of scheduled working times of the respective users. The scheduled working time is the working time which is assumed to be required for the working executed by the user until the user moves to the meeting place. The route until arrival at the meeting place may be appropriately determined on the side of the moving body system 1, or the user can designate any transit point.

Note that the moving body 100 may carry an information processing apparatus 150. The user can perform the preparatory working for the conference or the like to be held at the meeting place or the working in relation to the work having been being executed, by using the information processing apparatus 150 during the period until the user moves to the meeting place. It is enough for the moving body 100 to move the user to the meeting place, and the moving body 100 is not limited to any special construction. Further, it is not necessarily indispensable that the moving body 100 is unmanned. For example, a personnel for security and/or a personnel for providing the service to the user who gets on the moving body 100 may get on the moving body 100. It is not necessarily indispensable that the moving body 100 always performs the autonomous traveling. For example, the moving body 100 may be a moving body such as a vehicle or the like which is driven by the user or which is assisted for the driving by the user depending on the situation.

In the example shown in FIG. 1, the management server 400 and the plurality of moving bodies 100 are connected to one another by a network N in the moving body system 1. The network N is, for example, the global scale public communication network such as the internet or the like, for which it is also allowable to adopt any communication network such as WAN (Wide Area Network) and the like. Further, the network N may include the telephone communication network for the mobile phone or the like, and the wireless communication network such as WiFi (registered trademark) or the like. The user terminals 50 of the respective users are connected to the management server 400 via the network N.

The management server 400 is an apparatus which commands the moving body 100 to perform the operation when the utilization request for utilizing the moving body 100 is accepted from the user in the moving body system 1. The management server 400 allocates the moving bodies 100 respectively to the plurality of users who gather for the purpose of the conference or the like. The management server 400 may accept the utilization request from one user in relation to the respective users, or the management server 400 may accept the utilization requests individually from the respective users. If the management server 400 receives the utilization request from the user terminal 50, the management server 400 acquires the getting-on positions (departure places) of the respective users to which the vehicles are to be allocated. The management server 400 determines one moving body 100 for each of the users from the moving bodies 100 which are traveling in the vicinity of the getting-on position of each of the users. The management server 400 transmits such an operation command that "go to the getting-on position (of the corresponding user) to pickup the user" with respect to the determined moving body 100.

The management server 400 determines the meeting place (destination) depending on the scheduled working times to be consumed by the respective users, for example, for the preparatory workings for the conference or the like during the period until the plurality of users who gather attend the conference or the like. If the scheduled working time is included in the utilization request, the management server 400 can receive the scheduled working time from the user terminal 50. If the scheduled working time is not received, the management server 400 can also acquire the scheduled working time by making an inquiry with respect to the user terminal 50.

Note that the management server 400 may determine the meeting place while the time, which is required for the moving body 100 until arrival at the getting-on position of the user from the present position of the moving body 100, is included in the scheduled working time of the corresponding user. Further, the management server 400 may determine the meeting place depending on the scheduled working times of the respective users after the moving bodies 100 corresponding thereto respectively arrive at the getting-on positions of the respective users. Further, the management server 400 may reexamine and change the meeting place depending on the scheduled working times of the respective users after the management server 400 determines the meeting place and the respective users get on the moving bodies 100 corresponding thereto respectively. Accordingly, the management server 400 can suppress the influence exerted on the determination of the meeting place by the difference in the time required for the moving body 100 to go to the getting-on position of each of the users to pickup each of the users.

If the meeting place is determined, the management server 400 transmits such an operation command that "transport the users from the getting-on positions (of the corresponding users) to the meeting place" with respect to the moving bodies 100 allocated to the respective users. The moving body 100, which corresponds to each of the users, can travel from the departure place to the destination in accordance with the operation command transmitted from the management server 400. Note that the operation command may include a command submitted to the moving body 100 in order to provide a predetermined service to the user in response to the request from the user or irrelevant to the intention of the user, in addition to the command submitted to instruct the traveling to connect the departure place and the destination.

Further, the management server 400 also serves as a control apparatus for supporting the execution of the work of the user who intends to move to the meeting place by utilizing the moving body 100 in the moving body system 1 of this embodiment. In this case, the management server 400 performs a predetermined process so that the user can efficiently execute his/her own work in the moving body 100 which is being moved, after the management server 400 acquires the information relevant to the work of the user from the user terminal 50. The predetermined process is the process which is performed independently from the transmitting process for transmitting the operation command to the moving body 100. However, the predetermined process is the process to be performed in order to support the work of the user while considering that the moving body 100 moves to the destination by means of the autonomous driving. The work to be executed by the user includes, for example, the preparatory working to participate in the conference or the like and the working to be completed before participating in the conference or the like.

<System Configuration>

Figure 2:
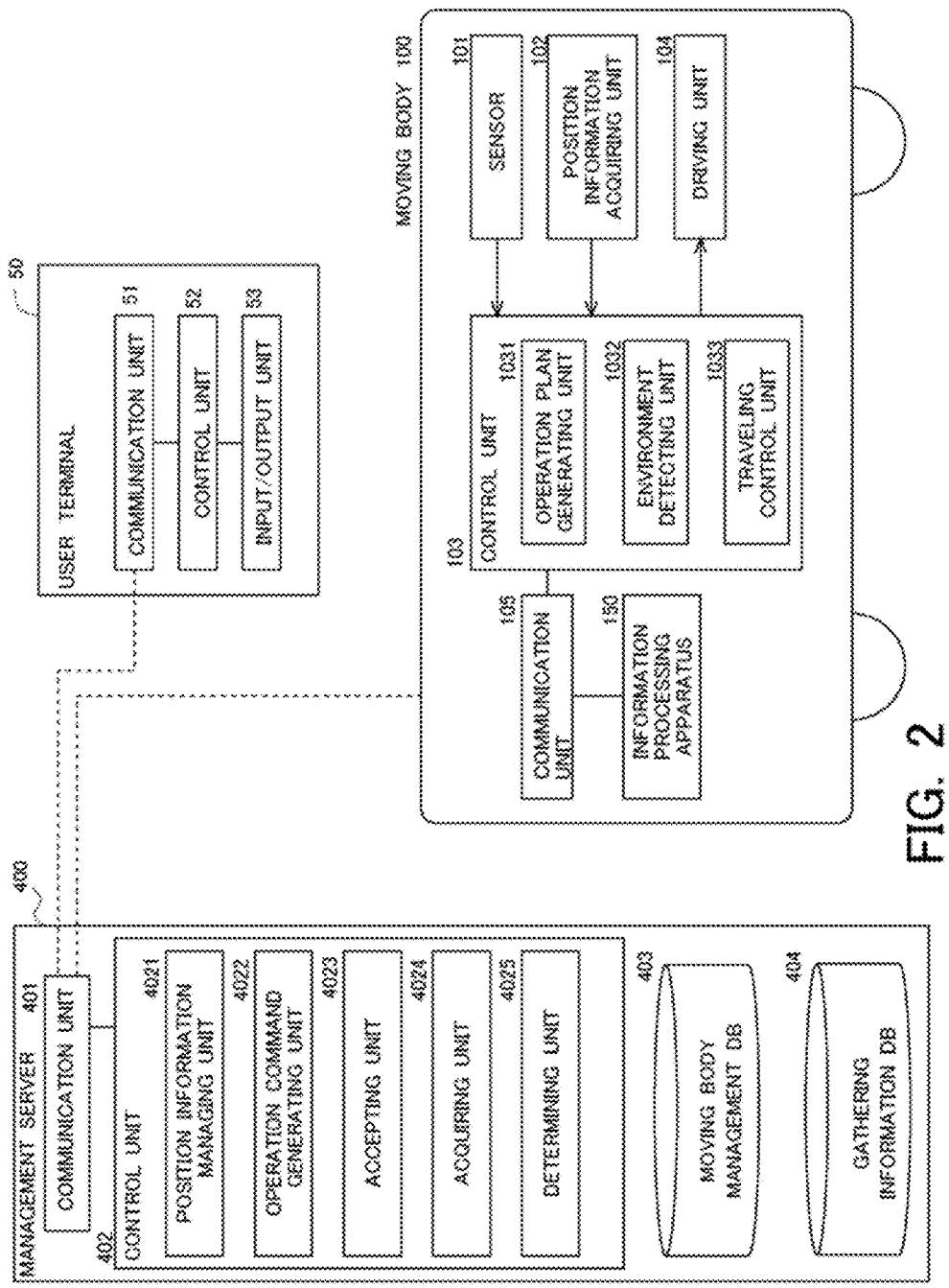
FIG. 2 exemplifies a schematic arrangement of a management server, a moving body, and a user terminal shown in FIG. 1.

FIG. 2 exemplifies a schematic arrangement of the management server, the moving body, and the user terminal shown in FIG. 1. An explanation will be made on the basis of FIG. 2 about the hardware configuration and the functional configuration of the management server 400, the moving body 100, and the user terminal 50.

The moving body 100 is a vehicle which travels in accordance with the operation command received from the management server 400. Specifically, the traveling route is generated on the basis of the operation command received via the wireless communication, and the moving body 100 travels on the road by means of a method adequate for the autonomous traveling while performing the sensing around the moving body 100. However, the moving body 100 may be a ship or an aircraft (for example, an airplane or a helicopter), provided that the user can be transported from the departure place to the destination. The moving body 100 is constructed to include a sensor 101, a position information acquiring unit 102, a control unit 103, a driving unit 104, a communication unit 105, and an information processing apparatus 150. The moving body 100 is operated by the electric power supplied from an unillustrated battery.

The sensor 101 is the means for performing the sensing around the moving body 100 in order to acquire the information used for the autonomous traveling of the moving body 100. Typically, the sensor 101 is constructed to include a stereo camera, a laser scanner, LIDAR (Light Detection and Ranging), and a radar. The information, which is acquired by the sensor 101, is transmitted to the control unit 103. The information is utilized by the control unit 103, for example, in order to recognize the traveling lane and/or the obstacle existing around the moving body 100. In this embodiment, the sensor 101 includes a visible light camera to perform the monitoring. Further, the position information acquiring unit 102 is the means for acquiring the present position of the moving body 100. Typically, the position information acquiring unit 102 is constructed to include, for example, a GPS (Global Positioning System) receiver. The information, which is acquired by the position information acquiring unit 102, is also transmitted to the control unit 103. For example, the information is utilized for a predetermined process such as the calculation of the route in order that the moving body 100 arrives at the destination by utilizing the present position of the moving body 100, the calculation of a required time required to arrive at the destination and the like.

The control unit 103 is a computer which performs the control of the moving body 100 on the basis of the information acquired from the sensor 101 and the position information acquiring unit 102. The control unit 103 is constructed, for example, by a microcomputer. Programs, which are stored in the storage means (for example, ROM (Read Only Memory) or the like) (not shown), are executed by CPU (Central Processing Unit) (not shown), and thus the functions are realized to perform the various processes described above. As specified examples of the various processes, the control unit 103 has functional modules of an operation plan generating unit 1031, an environment detecting unit 1032, and a traveling control unit 1033.

The operation plan generating unit 1031 acquires the operation command from the management server 400, and the operation plan generating unit 1031 generates the operation plan of the own moving body 100. The information, which relates to the departure place and the destination given to the moving body 100, is included in the operation command. Therefore, the operation plan generating unit 1031 calculates the route along which the moving body 100 should advance, and the operation plan generating unit 1031 generates the operation plan, on the basis of the departure place and the destination given from the management server 400 and the position of the moving body 100 obtained from the position information acquiring unit 102. The operation plan includes the data which relates to the route along which the moving body 100 travels as calculated as described above and the data which defines the process to be performed by the moving body 100 on a part or all of the route. The data, which is included in the operation plan, is exemplified, for example, by those described in (1) and (2) as follows.

(1) Data in which Route for Allowing Moving Body 100 to Travel is Represented by Set of Road Links The route, on which the moving body 100 travels, may be automatically generated, for example, on the basis of the given departure place and the destination by making reference to the stored map data. Note that the calculation of the route for allowing the moving body 100 to travel may rely on any process of an external apparatus (for example, the management server 400) without using any internal apparatus of the moving body 100. In this case, the management server 400 acquires the position from the moving body 100, and the management server 400 calculates the route along which the moving body 100 should advance. Further, the calculated route data may be either included in the operation command described above or transmitted to the moving body 100 distinctly.

(2) Data which Represents Process to be Performed by Moving Body 100 at Any Point on Route The process, which is to be performed by the moving body 100, includes, for example, "allow user to get on or get off moving body 100" and "temporarily stop". However, there is no limitation thereto. The operation plan, which is generated by the operation plan generating unit 1031, is transmitted to the traveling control unit 1033 described later on.

The environment detecting unit 1032 detects the environment around the moving body 100 required for the autonomous traveling, on the basis of the data acquired by the sensor 101. The detection target is, for example, the number and the position(s) of the lane(s), the number and the position(s) of the vehicle(s) existing around the subject vehicle, the number and the position(s) of the obstacle(s) existing around the subject vehicle (for example, pedestrian, bicycle, structure, and building), the structure of the road, and the road sign. However, there is no limitation thereto. The detection target may be anyone provided that the target is used to perform the autonomous traveling. For example, when the sensor 101 is a stereo camera, the object existing around the moving body 100 is detected by performing the image processing for the image data picked up thereby. Further, the environment detecting unit 1032 not only merely detects the object existing around the moving body 100, but the detected object may be also subjected to the tracking (detected object is continuously detected successively). For example, it is possible to determine the relative velocity of the object from the difference between the coordinates of the object detected one step before and the present coordinates of the object. The data relevant to the environment around the moving body 100 (hereinafter referred to as "environment data"), which is detected by the environment detecting unit 1032, is transmitted to the traveling control unit 1033 described later on.

The traveling control unit 1033 generates the control command in order to control the autonomous traveling of the moving body 100 on the basis of the operation plan generated by the operation plan generating unit 1031, the environment data generated by the environment detecting unit 1032, and the position information of the moving body 100 acquired by the position information acquiring unit 103. For example, the traveling control unit 1033 generates the control command in order to allow the moving body 100 to travel so that the moving body 100 travels along a predetermined route and any obstacle does not enter a predetermined safe area around the center of the own moving body 100. The generated control command is transmitted to the driving unit 104 described later on. As for the method for generating the control command for allowing the moving body to perform the autonomous traveling, it is possible to adopt any known method.

The driving unit 104 is the means for allowing the moving body 100 to travel on the basis of the control command generated by the traveling control unit 1033. The driving unit 104 is constructed to include, for example, a motor for driving wheels, an inverter, a brake, and a steering mechanism. For example, the motor and the brake are driven in accordance with the control command, and thus the autonomous traveling of the moving body 100 is realized. Further, the communication unit 105 is the communication means for connecting the moving body 100 to the network N. In this embodiment, the communication unit 105 can make communication with other apparatuses (for example, the management server 400) via the network N by utilizing the mobile communication service such as 3G (3rd Generation), LTE (Long Term Evolution) or the like.

Further, the moving body 100 is provided with the information processing apparatus 150. The information processing apparatus 150 is the apparatus which has predetermined functions to such an extent that the user, who gets on the moving body 100, can execute the work. The information processing apparatus 150 is constructed to include, for example, PC (personal computer) which serves as a main processing apparatus body, a display and a printer which serve as output devices, and a mouse, a keyboard and the like which serve as input devices. Further, the information processing apparatus 150 may be constructed to include a touch panel display which serves as both of the input device and the output device. The information processing apparatus 150 is the apparatus which is provided to contribute to the execution of the work by the user as described above, and the information processing apparatus 150 is constructed so that the apparatus does not participate in the autonomous traveling of the moving body 100 in principle. Therefore, the information processing apparatus 150 is constructed so that the apparatus does not act on the control unit 103 in principle. However, the information processing apparatus 150 is constructed so that the apparatus can make communication with the management server 400 via the communication unit 105. The information processing apparatus 150 is constructed so that the information, which is provided to support the execution of the work by the user, can be sent/received between the information processing apparatus 150 and the management server 400.

Next, the management server 400 will be explained. The management server 400 is the apparatus which manages the autonomous traveling of the plurality of moving bodies 100 and which transmits the operation commands. For example, if the management server 400 receives the request for utilization of the moving body 100 from the user, then the management server 400 acquires the getting-on position of the user, and then the management server 400 transmits the operation command to the moving body 100 which is traveling in the vicinity of the getting-on position. Further, the management server 400 also serves as an apparatus which supports the user so that the preparatory working for the conference or the like or the work having been being executed can be executed during the period until the user moves to the meeting place of the conference or the like. In this case, for example, the management server 400 can acquire, from the user terminal 50, the information relevant to the work of the user who utilizes the moving body 100, and the management server 400 can provide an environment in which the work is continued with the information processing apparatus 150 provided for the management server 400.

Then, the management server 400 is configured as a general computer. Specifically, the management server 400 is the computer which has a processor (not shown) such as CPU (Central Processing Unit), DSP (Digital Signal Processor) and the like, a main storage unit (not shown) such as RAM (Random Access Memory), ROM and the like, and an auxiliary storage unit (not shown) such as EPROM (Erasable Programmable ROM), a hard disk drive (HDD, Hard Disk Drive), a removable media and the like. Note that the removable media is, for example, a disk storage medium such as USB (Universal Serial Bus) memory, CD (Compact Disc), DVD (Digital Versatile Disc) and the like. For example, an operating system (Operating System: OS), various programs, and various tables are stored in the auxiliary storage unit. The programs stored therein are loaded and executed on the working area of the main storage unit, and the respective configuration units and the like are controlled in accordance with the execution of the programs. Thus, it is possible to realize the functions which conform to the predetermined purpose.

The management server 400 has a communication unit 401. The communication unit 401 is connected to another apparatus via the network N to perform the communication, for example, with respect to the moving body 100 and the user terminal 50. The communication unit 401 is, for example, a LAN (Local Area Network) interface board or a wireless communication circuit for the wireless communication. The LAN interface board and the wireless communication circuit are connected to the network N such as the internet or the like which is the public communication network.

An explanation will now be made about the functional unit possessed by the management server 400. A control unit 402 is formed as the functional unit by executing the program by the processor as described above in the management server 400. As described above, the control unit 402 performs the process which relates to the autonomous traveling of the moving bodies 100, and the process which supports the gathering of the plurality of users by means of the moving bodies 100. In particular, the control unit 402 includes, as functional units, a position information managing unit 4021, an operation command generating unit 4022, an accepting unit 4023, an acquiring unit 4024, and a determining unit 4025. The position information managing unit 4021 and the operation command generating unit 4022 are the functional units which relate to the process relevant to the autonomous traveling of the moving body 100. The accepting unit 4023, the acquiring unit 4024, and the determining unit 4025 are the functional units which relate to the process for supporting the gathering of the plurality of users by means of the management server 400.

At first, an explanation will be made about the accepting unit 4023, the acquiring unit 4024, and the determining unit 4025 which are the functional units relevant to the process for supporting the gathering of the plurality of users by means of the management server 400. The accepting unit 4023 accepts the utilization request for the moving bodies 100 utilized for the plurality of users to gather. The utilization request includes the information relevant to the conference or the like which is the purpose for the plurality of users to gather. The information relevant to the conference or the like is the information of, for example, the name, the date and time of gathering, and the management user stored, for example, in the gathering management information table of the gathering information DB 404. Further, the utilization request includes the information relevant to the respective users who participate in the conference or the like. The information relevant to the respective users is the information of, for example, the user ID, the getting-on position, and the scheduled working time stored, for example, in the gathering user information table of the gathering information DB 404 described later on.

The acquiring unit 4024 acquires the scheduled working times required for the works intended to be executed in the moving bodies by the respective users who participate in the conference or the like, during the period until the respective users move to the meeting place. The acquiring unit 4024 can acquire, for example, the scheduled working time included in the utilization request transmitted from the user terminal 50 to the accepting unit 4023.

Figure 3:
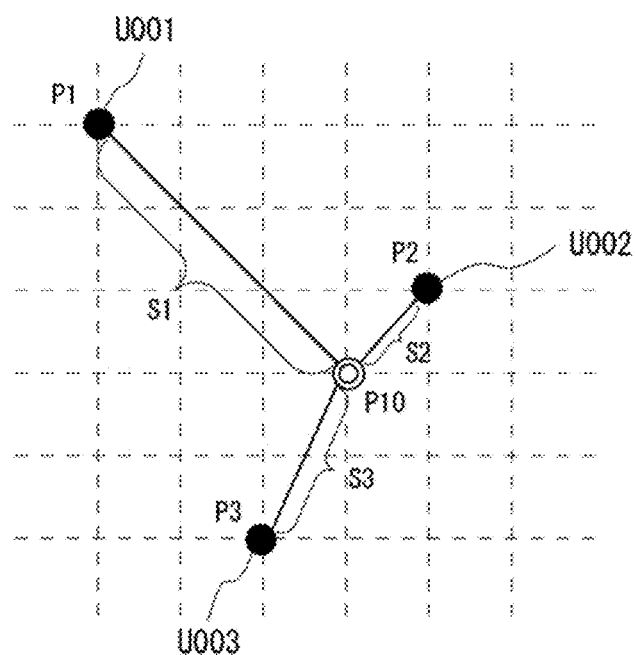
FIG. 3 exemplifies a method for determining a meeting place.

The determining unit 4025 determines the meeting place at which the respective users gather. An explanation will be made on the basis of FIG. 3 about an example of the process for determining the meeting place by the determining unit 4025. With reference to FIG. 3, a black circle, which is affixed with a reference numeral of U001, indicates a getting-on position P1 for the user having user ID of U001 (hereinafter referred to as "user U001") to get on the moving body 100. Similarly, black circles, which are affixed with reference numerals of U002 and U003, indicate a getting-on position P2 and a getting-on position P3 for the user U002 and the user U003 to get on the moving bodies 100 respectively.

In this case, it is assumed that the scheduled working times of the user U001, the user U002, and the user U003 are 1.5 hours, 0.5 hour, and 1.0 hour respectively. Further, it is assumed that the distance from the getting-on position P1 of the user U001 to the meeting place P10 is S1, the distance from the getting-on position P2 of the user U002 to the meeting place P10 is S2, and the distance from the getting-on position P3 of the user U003 to the meeting place P10 is S3. The scheduled working times of the respective users are shortened in an order of the user U001, the user U003, and the user U002. Therefore, the determining unit 4025 can determine the position of the meeting place P10 so that S1>S3>S2 is given in relation to the distances for the respective users to arrive at the meeting place P10. It is enough that the determining unit 4025 can determine the meeting place so that the meeting place is closer to the getting-on position of the user who has the scheduled working time shorter than those of the other users. The meeting place may be determined by means of any method other than the method exemplified in FIG. 3.

Next, the position information managing unit 4021 and the operation command generating unit 4022 will be explained. The position information managing unit 4021 collects and manages the position information from the plurality of moving bodies 100 which are managed by the management server 400. Specifically, the present position information is received from the plurality of moving bodies 100 at the concerning point in time in every predetermined cycle, and the information is stored in the moving body management DB 403.

The operation command generating unit 4022 generates the operation commands for the moving bodies 100 corresponding to the respective users on the basis of the getting-on positions for the respective users to get on the moving bodies 100 and the meeting place determined by the determining unit 4025. The information about the getting-on positions for the respective users to get on the moving bodies 100 is included in the utilization request received by the accepting unit 4023 from the user terminal 50, and the operation command generating unit 4022 is informed of the information. The operation command generating unit 4022 determines the moving bodies 100 to be allocated to the respective users on the basis of the getting-on positions of the respective users. The operation command generating unit 4022 notifies the determined moving bodies 100 of the corresponding operation commands.

Further, the utilization request can also include the transit point via which the moving body 100 goes during the process to arrive at the determined meeting place. When the transit point is included in the utilization request, if the user intends to stop the moving body 100 for a predetermined time at the transit point, then this intention may be included in the utilization request. If the utilization request is received as described above, the operation command generating unit 4022 may determine the meeting place on the assumption that the scheduled working time includes the predetermined time for stopping the moving body 100.

Any one of the respective functional constitutive elements or components of the management server 400 or a part of the process thereof may be executed by another computer connected to the network N. Further, the series of processes executed by the management server 400 can be executed by the hardware, but the processes can be also executed by the software.

Further, the management server 400 has, in its auxiliary storage unit, the moving body management DB 403 and the gathering information DB 404. The moving body management DB 403 stores various pieces of information in relation to the plurality of moving bodies 100 which perform the autonomous traveling. The gathering information DB 404 stores various pieces of information in relation to the gathering when the plurality of users gather for the purpose of the conference or the like. The database (Database) is constructed such that the program of the database management system (Database Management System DBMS), which is executed by the processor, manages the data stored in the auxiliary storage unit. The moving body management DB 403 and the gathering information DB 404 are, for example, relational databases.

An explanation will now be made on the basis of FIG. 4 about the configuration of the moving body management information stored in the moving body management DB 403. FIG. 4 exemplifies the data structure of the moving body management information. The moving body management information table for storing the moving body management information has respective fields of "moving body ID", "present position", and "mobile service". The moving body ID field stores the identification information which is provided to specify the moving bodies 100 managed by the management server 400 in the moving body system 1. The present position field stores the information which is provided to specify the place at which each of the moving bodies 100 is positioned at the present point in time. Specifically, the present position is the information which relates to the latitude and the longitude for specifying the present position of the moving body 100. The information about the present position of the moving body 100 is acquired by the position information acquiring unit 102 of the moving body 100. The moving body 100 acquires the information of the present position at predetermined time intervals, and the information is transmitted to the management server 400. Every time when the information of the present position is received from the moving body 100, the management server 400 updates the present position field which corresponds to the moving body 100 in the moving body management DB 403. The mobile service field stores the information which indicates whether or not the moving body 100 is in the middle of the provision of the mobile service for the user by means of the autonomous traveling. For example, if the moving body 100 is providing the mobile service, "in middle of service" is set in the mobile service field. If the moving body 100 is not providing the mobile service, "not in middle of service" is set in the mobile service field.

Further, an explanation will be made on the basis of FIGS. 5 and 6 about the configuration of the gathering information stored in the gathering information DB 404. FIG. 5 exemplifies the data structure of the gathering management information. One record of the gathering management information table for storing the gathering management information shown in FIG. 5 stores the information in relation to one piece of gathering in which the respective users get on the allocated moving bodies respectively to gather at the meeting place. Further, FIG. 6 exemplifies the data structure of the gathering user information. One record of the gathering user information table for storing the gathering user information shown in FIG. 6 stores the information of one user in relation to the gathering of one record shown in FIG. 5.

The gathering management information table exemplified in FIG. 5 has respective fields of "gathering management ID", "name", "date and time of gathering", "management user", and "meeting place". The gathering management ID field stores the identification information for specifying the conference or the like at which the plurality of users gather. The name field stores the name of the conference or the like specified by the gathering management ID. If the name corresponding to the gathering management ID is set beforehand, the user, who participates in the conference or the like, can distinguish the conference or the like scheduled to participate in, by using the name as well. The date and time of gathering field stores the date and time on which the conference or the like specified by the gathering management ID is held. The management user field stores the identification information (user ID) of the user who organizes the conference or the like specified by the gathering management ID. The management user behaves as a representative of the plurality of users who participate in the conference or the like, and the management user can set the information of, for example, the name of the conference or the like and the date and time of gathering by the aid of the user terminal 50. It is also allowable that the management user can collectively execute, from the user terminal 50, the utilization request to utilize the moving bodies 100 for the respective users who participate in the conference or the like. The meeting place field stores the meeting place (gathering place) of the conference or the like specified by the gathering management ID. The meeting place is the position information specified, for example, by the latitude and the longitude or the address or the like. The meeting place is determined by the determining unit 4025 of the management server 400 on the basis of the scheduled working times of the users who participate in the conference or the like. Note that the determining unit 4025 of the management server 400 may determine the meeting place so that the respective users gather in time for the date and time of gathering. The management server 400 sets the determined meeting place in the meeting place field.

The gathering user information table exemplified in FIG. 6 has respective fields of "gathering management ID", "user ID", "getting-on position", "scheduled working time", and "moving body ID". The gathering management ID field stores the identification information for specifying the conference or the like at which the plurality of users gather. The gathering management ID is allowed to correspond to the gathering management ID of the gathering management information table shown in FIG. 5. The gathering of the conference or the like in which the users of each of the records participate is specified by the gathering management ID. The user ID field stores the user ID's of the users who participate in the conference or the like specified by the gathering management ID. The getting-on position field stores the position at which the user gets on the moving body 100 allocated for the user to move to the meeting place of the conference or the like specified by the gathering management ID. The getting-on position is designated, for example, when the user submits the utilization request for the moving body 100 by using the user terminal 50.

The scheduled working time field stores the working time assumed to be required for the work intended to be executed in the moving body 100 during the period until the user moves to the meeting place. The management server 400 may receive the scheduled working time together with the utilization request in relation to each of the users, for example, by the aid of the user terminal 50 of the management user. If the information about the scheduled working time is not included in the utilization request, the management server 400 may make inquiries with respect to the user terminals 50 to acquire the scheduled working times of the respective users. Further, the management server 400 may estimate and acquire the scheduled working times of the respective users on the basis of the attribute information of the respective users. The attribute information is, for example, the years of experience of the work, whether or not the user is an organizer of the conference, the history of actual working times in the past during the traveling or movement by the moving body system. The gathering user information table may have a field for storing the attribute information as described above.

The moving body ID field stores the identification information (moving body ID) of the moving body 100 allocated for the user of the user ID field. If the management server 400 accepts the utilization request for utilizing the moving body 100 from the user, then the management server 400 determines the moving body 100 to be allocated, and the management server 400 sets the moving body ID of the determined moving body 100 in the moving body ID field.

Next, the user terminal 50 of the user will be explained. In this embodiment, the user terminal 50 is a device or apparatus which is principally utilized by the user to execute his/her own work in the office. However, no problem arises even when the user utilizes the user terminal 50 for any purpose other than the above. The user terminal 50 is a personal computer (Personal Computer, PC). However, the user terminal 50 may be a small-sized computer such as a smartphone, a mobile phone, a tablet terminal, a personal information terminal, or a wearable computer (for example, a smartwatch) which is usable for the work of the user. The user terminal 50 is constructed to include a communication unit 51, a control unit 52, and an input/output unit 53.

The communication unit 51 is the communication means which is provided to make connection with the network N. The control unit 52 is a computer which administers the control of the user terminal 50. The control unit 52 is constructed, for example, by a microcomputer. Functions to perform various processes are realized by executing programs stored in the storage means (ROM or the like) by CPU (any one of them is not shown). Further, the control unit 52 performs the interaction with the user via the input/output unit 53. The input/output unit 53 is the means which accepts the input operation performed by the user and which presents the information with respect to the user. Specifically, the input/output unit 53 is composed of a touch panel and control means thereof, and/or a liquid crystal display and control means thereof. The touch panel and the liquid crystal display are constructed by one touch panel display. Note that the input operation performed by the user is not limited to those performed by the aid of the touch panel display. For example, the input operation may be performed with a hardware switch or the like.

The control unit 52 delivers, to the management server 400, the utilization request of the user which is submitted via the input/output unit 53, for example, if the user desires to utilize the moving body 100. The determining unit 4025 of the management server 400 can determine the meeting place on the basis of the scheduled working time included in the utilization request. Then, if the meeting place is determined, the operation command generating unit 4022 of the management server 400 executes the generating process for generating the operation command.

<Flow of Process>

Figure 7:
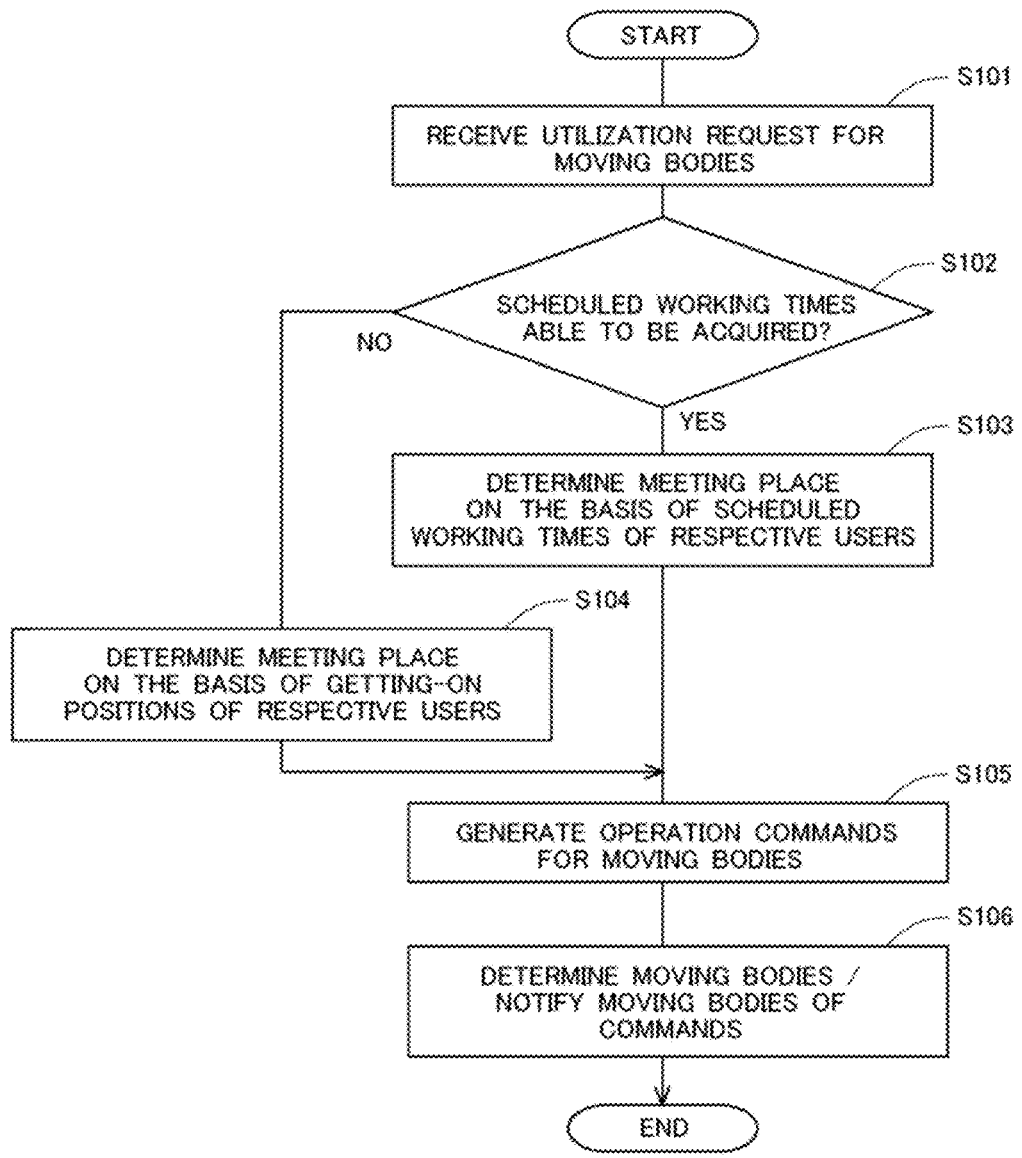
FIG. 7 shows a flow chart exemplifying an operation control process.

FIG. 7 shows a flow chart exemplifying an operation control process performed by the management server 400. The operation control process is the process which makes it possible for each of the users to perform the preparatory working for the conference or the like to be held at the meeting place, by utilizing the time during the movement to the meeting place in the moving body 100 if the plurality of users gather. Specifically, the management server 400 determines the meeting place so that the meeting place is close to the getting-on position of the user who has the shorter scheduled working time on the basis of the scheduled working times of the respective users. Accordingly, each of the users can secure the working time corresponding to the scheduled working time in the moving body 100.

At first, in S101, the accepting unit 4023 receives the utilization request for utilizing the moving body 100. The utilization request includes the information of, for example, the name of the conference or the like which is the purpose of the gathering, the date and time of the gathering, and the management user who calls the conference or the like. The accepting unit 4023 stores the information included in the utilization request in the gathering management information table of the gathering information DB 404 shown in FIG. 5. Further, the utilization request includes the information of the users who participate in the conference or the like. The information of the user who participates in the conference or the like includes the user ID and the getting-on position to get on the moving body 100, and the information of the user may include the information of the scheduled working time in the moving body 100. The accepting unit 4023 can collectively receive the information of the user who participates in the conference or the like together with the utilization request sent from the user terminal 50 of the management user. Further, the accepting unit 4023 may individually receive the information of, for example, the user ID, the getting-on position, and the scheduled working time from the user terminal 50 of each of the users who participate in the conference or the like. The accepting unit 4023 stores the information of the user received from the user terminal 50 in the gathering user information table of the gathering information DB 404 shown in FIG. 6.

Subsequently, in S102, the acquiring unit 4024 judges whether or not the scheduled working times of the respective users who participate in the conference or the like can be acquired. If the information of the scheduled working times is included in the utilization request received in S101, the acquiring unit 4024 can acquire the scheduled working times of the respective users stored in the gathering user information table of the gathering information DB 404. If the scheduled working time of at least one user can be acquired (S102: Yes), the process proceeds to S103. If any scheduled working time of any user cannot be acquired (S102: No), the process proceeds to S104.

In 5103, the determining unit 4025 determines the meeting place on the basis of the scheduled working times of the respective users acquired in S102. The determining unit 4025 determines the meeting place so that the meeting place is close to the getting-on position of the user who has the scheduled working time shorter than those of the other users. The determining unit 4025 may decide the predetermined point on the basis of the getting-on positions of the respective users to determine the meeting place so that the meeting place is close to the getting-on position of the user who has the shortest scheduled working time and the meeting place is distant from the getting-on position of the user who has the longest scheduled working time, on the basis of the predetermined point. The determining unit 4025 stores the determined meeting place in the gathering management information table of the gathering information DB 404.

S104 is the process to be performed when any scheduled working time of any user is not included in the utilization request. In this case, the determining unit 4025 determines the meeting place on the basis of the getting-on positions of the respective users. The determining unit 4025 can determine, for example, as the meeting place, the central point of the respective getting-on positions of the plurality of users who gather. Note that the determining unit 4025 may acquire the scheduled working times by inquiring of a part of the users of the respective users about the scheduled working times and/or estimating the scheduled working times of a part of the users.

Subsequently, in 5105, the operation command generating unit 4022 generates the operation commands for the moving bodies 100 corresponding to the respective users on the basis of the getting-on positions for the respective users to get on the moving bodies 100 and the meeting place determined by the determining unit 4025.

In S106, the operation command generating unit 4022 determines the moving bodies 100 to be allocated to the respective users, on the basis of the getting-on positions of the respective users. The operation command generating unit 4022 makes reference to the moving body management information table of the moving body management DB 403 shown in FIG. 4, for example, so that the moving body 100, which has the present position closer to the getting-on position of the user, is selected from the moving bodies 100 which are not in the middle of the service and determined as the moving body 100 to be allocated to the user. Further, if the operation command generating unit 4022 can acquire the scheduled working times of the respective users, the operation command generating unit 4022 may determine the moving bodies 100 to be allocated in an order starting from the user having the longer scheduled working time. Accordingly, the operation command generating unit 4022 can preferentially allocate the moving body 100 located closer to the getting-on position of the user with respect to the user having the longer scheduled working time. The operation command generating unit 4022 notifies the corresponding moving body 100 of the operation command generated in 5105, and the operation control process shown in FIG. 7 is terminated.

Figure 8:
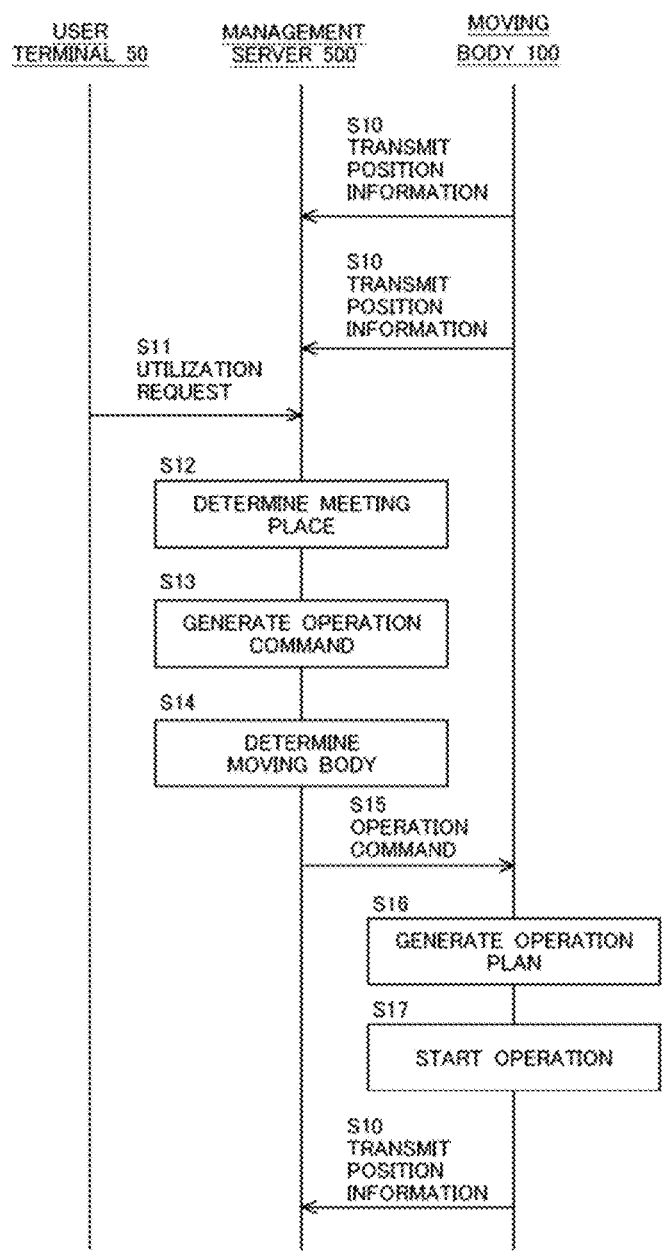
FIG. 8 exemplifies a process flow until the moving body begins a mobile service for a user by means of the autonomous traveling.
Figure 9:
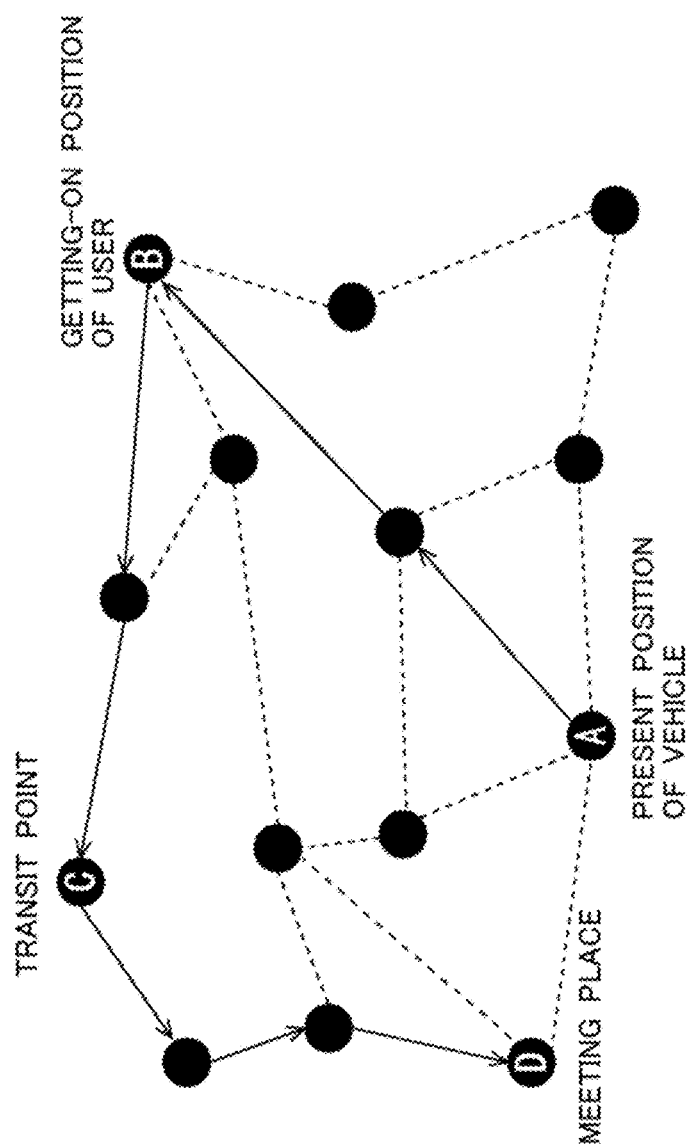
FIG. 9 exemplifies traveling routes to be provided when the moving body travels from a departure place to a destination.

An explanation will now be made on the basis of FIG. 8 about the flow of the process until the moving body 100 starts the mobile service for the user based on the autonomous traveling after the operation command generating unit 4022 generates the operation command on the basis of the utilization request of the user. In this embodiment, an explanation will be made about an example in which the moving body 100 moves along the traveling route exemplified in FIG. 9.

The moving body 100 periodically notifies the management server 400 of the position information (S10). In the management server 400, the received present position information is inputted into the present position field corresponding to the moving body 100, of the moving body management DB 403. The process of S10 is repeatedly executed at constant time intervals.

The user transmits the utilization request for requesting the allocation of the moving bodies 100 from the user terminal 50 to the management server 400 (S11). The utilization request includes the information relevant to the plurality of users who participate in the conference or the like. The information relevant to the user is, for example, the user ID for identifying the user and the getting-on position to get on the moving body 100. Further, the utilization request may also include the scheduled working time of the work to be executed until the plurality of users gather. Note that the utilization request may be transmitted to the management server 400 individually from the user terminals 50 of the respective users who participate in the conference or the like.

If the utilization request is accepted, the determining unit 4025 of the management server 400 determines the meeting place at which the plurality of users gather (S12). The determining unit 4025 can determine the meeting place, for example, on the basis of the getting-on positions for the respective users to get on the moving bodies 100 and the scheduled working times of the works to be executed until the respective users move to the meeting place.

The operation command generating unit 4022 generates the operation command for each of the users depending on the utilization request (S13). The operation command designates at least the getting-on position to get on the moving body 100 which is the departure place and the meeting place which is the destination. Further, the operation command may designate the traveling route for the moving body 100 to arrive at the meeting place from the getting-on position. Further, the operation command may also include the information in relation to the process which is to be performed on the route and the service which is to be provided. In this case, it is assumed that the system is requested for the movement of the user from Node B to Node D shown in FIG. 9.

The operation command generating unit 4022 determines the moving body 100 which provides the service to the user (S14). For example, the operation command generating unit 4022 makes reference to the present position information of the moving body 100 stored in the moving body management DB 403, and the operation command generating unit 4022 determines the moving body 100 which can provide the mobile service while considering the getting-on position for the user to get on the moving body 100. In the example shown in FIG. 9, it is assumed that the moving body 100, which is positioned at Node A, is determined as the moving body 100 which is to transport the user to the meeting place. The management server 400 transmits the operation command to the determined moving body 100 (S15).

Subsequently, the operation plan generating unit 1031 of the moving body 100 generates the operation plan on the basis of the received operation command sent from the management server 400 (S16). The operation plan generating unit 1031 generates the operation plan, for example, such that the moving body 100 travels along the route indicated by solid lines shown in FIG. 9, the user gets on the moving body 100 at Node B, and the user gets off the moving body 100 at Node D. If Node C is designated as a transit point in the utilization request sent from the user, the operation plan generating unit 1031 generates the operation plan which includes the movement from Node B via Node C to Node D.

The generated operation plan is transmitted to the traveling control unit 1033, and the moving body 100 starts the movement or operation (S17). Note that the present position information of the moving body 100 is also periodically transmitted to the management server 400 during the operation (S10).

Note that such an example has been exemplified in this section that the moving body 100 generates the operation plan on the basis of the utilization request. However, the operation plan may be generated by the management server 400. In this case, the operation plan, which is generated by the management server 400, is transmitted to the moving body 100 determined in S14. Further, the processes from S13 to S17 described above are executed for each of the plurality of users included in the utilization request. That is, the operation command for the moving body 100 is generated for each of the users, and the moving body 100 as the allocation object is determined therefor. In this case, the operation command generating unit 4022 may generate the operation commands, for example, in an order starting from the user having the longer scheduled working time, and the moving bodies 100 are allocated. Accordingly, the user, who has the longer scheduled working time, can start the movement toward the meeting place prior to the other users.

<Function and Effect of Embodiment>

In this embodiment, if the management server 400 accepts the utilization request, the management server 400 determines the meeting place at which the respective users gather, on the basis of the scheduled working times of the respective users. Further, the management server 400 determines the moving body 100 which is to be allocated for each of the users. Then, the management server 400 transmits, to the respective moving bodies 100, the operation commands so that the moving bodies 100 go to the getting-on positions of the users to pickup the users and the moving bodies 100 transport the users from the getting-on positions to the meeting place. Accordingly, the respective users can continue the works which are being executed, in the moving bodies that move from the getting-on positions to the meeting place, or the respective users can perform the preparatory workings for the conference or the like to be held at the meeting place. Therefore, the respective users can efficiently utilize the traveling times required to move to the meeting place in order to execute the works.

Further, the management server 400 determines the meeting place so that the meeting place gets closer to the getting-on position of the user who has the shortest scheduled working time, and the meeting place becomes more distant from the getting-on position of the user who has the longest scheduled working time, on the basis of the predetermined point. Accordingly, the management server 400 can suppress overs and shorts of the working times until the respective users move to the meeting place. Therefore, the respective users can efficiently utilize the traveling times until arrival at the meeting place in order to execute the works.

First Modified Embodiment

If the acquiring unit 4024 acquires the scheduled working time of one user in 5102 of the operation control process shown in FIG. 7, the determining unit 4025 determines the meeting place assuming that the scheduled working time of the one user is longer than the scheduled working times of the other users of the respective users who gather. Specifically, the determining unit 4025 may determine the meeting place so that the meeting place becomes more distant from the getting-on position for the one user to get on the moving body 100. The traveling time of the one user, which is required to travel or move from the getting-on position to the meeting place, is longer than those of the other users, and hence the one user can secure the longer working time.

In the first modified embodiment, the determining unit 4025 acquires the scheduled working time of the user who is assumed to have the long working time. Thus, the determining unit 4025 can determine the meeting place without acquiring the scheduled working times of the other users. Further, it is enough to designate the scheduled working time of one user. Therefore, the procedure of the utilization request is simplified.

Second Modified Embodiment

In the operation control process shown in FIG. 7, the determining unit 4025 acquires the scheduled working times of the respective users included in the utilization request, and the determining unit 4025 determines the meeting place on the basis of the acquired scheduled working times. On the contrary, in the second modified embodiment, the acquiring unit 4024 makes inquiries with respect to the user terminals 50, and thus the acquiring unit 4024 acquires the scheduled working times of the respective users. An explanation will now be made on the basis of FIG. 10 about an operation control process performed by the management server 400 according to the second modified embodiment. FIG. 10 shows a flow chart exemplifying the operation control process according to the second modified embodiment. The processes of S101, S105, S106 shown in FIG. 10 are the same as or equivalent to the processes affixed with the same reference numerals in FIG. 7, any explanation of which will be omitted.

In S203, the acquiring unit 4024 inquires of the user terminals 50 about the scheduled working times of the respective users. The acquiring unit 4024 can inquire, for example, of the user terminal 50 which is the transmission source of the utilization request about the scheduled working times of the respective users. Alternatively, if the acquiring unit 4024 can acquire the transmission sources of the user terminals 50 corresponding to the respective users, the acquiring unit 4024 may inquire of the respective user terminals 50 about the scheduled working times. The scheduled working times, which are acquired by making inquiries with respect to the user terminals 50, are stored by the acquiring unit 4024 in the gathering user information table of the gathering information DB 404.

In S204, the determining unit 4025 determines the meeting place on the basis of the scheduled working times acquired by the acquiring unit 4024 by making inquiries with respect to the user terminals 50 in S203. The process, in which the determining unit 4025 determines the meeting place on the basis of the scheduled working times, is the same as or equivalent to the process in which the meeting place is determined in S103 shown in FIG. 7. The determining unit 4025 stores the determined meeting place in the gathering management information table of the gathering information DB 404.

Note that FIG. 10 shows the example in which the acquiring unit 4024 inquires of the user terminals 50 if the scheduled working time is not acquired for any one of the users. However, there is no limitation thereto. If the scheduled working times of a part of the users are not acquired, the acquiring unit 4024 may inquire of the user terminals 50 about the scheduled working times in relation to the part of the users.

In the second modified embodiment, the management server 400 can determine the meeting place on the basis of the scheduled working times of the larger number of users by inquiring of the user terminals 50 about the scheduled working times. Therefore, the management server 400 can suppress overs and shorts of the working time of each of the users.

Third Modified Embodiment

In the operation control process of the second modified embodiment shown in FIG. 10, the acquiring unit 4024 acquires the scheduled working times by inquiring of the user terminals 50 in S203. On the contrary, in the third modified embodiment, the acquiring unit 4024 acquires the scheduled working times by estimating the scheduled working times of the respective users on the basis of the attribute information of the users. That is, in the operation control process according to the third modified embodiment, the acquiring unit 4024 estimates the scheduled working times of the respective users in place of the process of S203 of the operation control process shown in FIG. 10. Therefore, in this section, an explanation will be made about the process for estimating the scheduled working times of the respective users. Note that the operation control process according to the third modified embodiment is the same as or equivalent to the operation control process shown in FIG. 10 except for the process of S203. Therefore, the same or equivalent processes are omitted from the explanation.

The acquiring unit 4024 estimates the scheduled working times of the respective users on the basis of the attribute information of the respective users in relation to the utilization request. The attribute information is, for example, the years of experience of the user. The attribute information may be previously set by providing a field of "years of experience" in the gathering user information table of the gathering information DB 404 shown in FIG. 6. Alternatively, the attribute information can be the history of working times as provided when the user attended the same or equivalent conference or the like in the past. The history of working times can be accumulated, for example, by storing the actual working times in the gathering information DB 404 by the management server 400 when the movement to the meeting place is completed after the respective users get on the moving bodies 100.

An explanation will now be made about an example of the method for estimating the scheduled working time. A classification field is provided in the gathering management information table shown in FIG. 5 to store the classification of the conference or the like specified by the gathering management ID. The classification is the classification which is provided to specify, for example, the purpose of the gathering and the client. The classification can be, for example, "business with X company", "contract with Y company", and "in-house arrangement". The working time (hereinafter referred to as "reference working time" as well), which serves as the reference or basis to estimate the scheduled working time, is previously defined for every classification. The acquiring unit 4024 can define the reference working time, for example, such that the reference working time is 2 hours if the classification is "business with X company", 1 hour if the classification is "contract with Y company", or 0.5 hour if the classification is "in-house arrangement". Subsequently, the acquiring unit 4024 estimates the scheduled working time by multiplying the reference working time, for example, by the coefficient corresponding to the years of experience of the user. It is appropriate that the longer the years of experience are, the smaller the value of the coefficient to be set is. The coefficient corresponding to the years of experience of the user can be defined, for example, such that the coefficient is 1.5 if the years of experience are less than 5 years, the coefficient is 1 if the years of experience are not less than 5 years and less than 10 years, or the coefficient is 0.8 if the years of experience are not less than 10 years. For example, if the reference working time is 2 hours, the acquiring unit 4024 can estimate the scheduled working time of the user having the years of experience of 12 years to be 2×0.8=1.6 hours.

Alternatively, the acquiring unit 4024 may acquire the history information of the same user as the user who participated in the conference or the like of the same classification, from the history of the working times in the past, and the acquiring unit 4024 may estimate the acquired actual working time as the scheduled working time. If the history information of the same user is not present, the acquiring unit 4024 may acquire the history information of another user who has the difference in the years of experience of not more than a predetermined year, and the acquiring unit 4024 may estimate the actual working time of the another user as the scheduled working time.

In the third modified embodiment, the management server 400 estimates the scheduled working time on the basis of the attribute information of the respective users. Therefore, the management server 400 can determine the meeting place on the basis of the scheduled working times which more conform to the actual circumstances.

Fourth Modified Embodiment

The determining unit 4025 may determine the meeting place on the basis of the scheduled working times of predetermined users as obtained by excluding the users having the scheduled working times which are acquired by the acquiring unit and which are shorter than a predetermined time. The predetermined time can be defined, for example, to be a half of the longest scheduled working time of those of the respective users. In this case, the determining unit 4025 can determine the meeting place so that the predetermined users having the longer scheduled working times, who are included in the predetermined users having the scheduled working times of not less than the predetermined time, have longer distances from the getting-on positions to the meeting place. In the fourth modified embodiment, the determining unit 4025 can determine the meeting place while preferentially considering the working times of the users who have the scheduled working times of not less than the predetermined time.

<Recording Medium>

The program, which allows the computer or other machine or apparatus (hereinafter referred to as "computer or the like") to realize any one of the functions described above, can be recorded on a recording medium which is readable by the computer or the like. The functions can be provided by reading and executing the program of the recording medium by the computer or the like.

In this context, the recording medium, which is readable by the computer or the like, refers to any non-transitory recording medium on which the information including, for example, the data and the program can be accumulated by means of the electric, magnetic, optical, mechanical, or chemical action and the information can be read by means of the computer or the like. Among the recording media as described above, those removable from the computer or the like are, for example, flexible disk, magneto-optical disk, CD-ROM, CD-R/W, DVD, blue-ray disk, DAT, 8 mm tape, and memory card such as flash memory or the like. Further, the recording medium fixed to the computer or the like includes, for example, hard disk and ROM. Further, SSD (Solid State Drive) can be utilized either as the recording medium which is removable from the computer or the like or as the recording medium which is fixed to the computer or the like.

What is claimed is:

1. A moving body system for controlling operation of a plurality of moving bodies, the moving body system comprising:
  at least one processor configured to:
    accept utilization requests for requesting utilization of the plurality of moving bodies corresponding to respective users in order that the plurality of users gather at a meeting place by using the plurality of moving bodies corresponding to the respective users;
    acquire scheduled working times of the respective users in the plurality of moving bodies when the respective users move by the plurality of moving bodies corresponding to the users respectively;
    determine the meeting place at which the respective users gather, the meeting place being a location that is closer to a getting-on position of a first user of the users who has a scheduled working time shorter than a scheduled working time of other users of the users; and
    transmit one or more operation commands to the plurality of moving bodies, such that the one or more operation commands cause the plurality of moving bodies to travel to the meeting place based on respective getting-on positions of the respective users.

2. The moving body system according to claim 1, wherein:
  the at least one processor determines the meeting place based on a predetermined location, which is set based on the getting-on positions for the respective users to get on the plurality of moving bodies so that the meeting place is located at a position at which the meeting place is closer to the getting-on position of the first user as compared with the predetermined location in relation to the first user, and
  the meeting place is located at the position at which the meeting place is more distant from the getting-on position of a second user of the plurality of users as compared with the predetermined location in relation to the second user, the second user having a longest scheduled working time.

3. The moving body system according to claim 1, wherein the at least one processor acquires the scheduled working time of the first user of the plurality of users together with the utilization request, and determines the meeting place based on the scheduled working time of the first user is longer than the scheduled working time of the other user of the plurality of users or the scheduled working times of the other users of the plurality of users.

4. The moving body system according to claim 1, wherein the at least one processor acquires the scheduled working times of the respective users by transmitting inquiries about the scheduled working times with respect to the respective users relevant to the utilization request.

5. The moving body system according to claim 4, wherein the at least one processor determines the meeting place based on the scheduled working times of a predetermined set of users of the plurality of users, the predetermined set of users being all of the users of the plurality of users except for users which have acquired scheduled working times shorter than a predetermined time.

6. The moving body system according to claim 1, wherein the at least one processor acquires the scheduled working times of the respective users by estimating the scheduled working times of the respective users based on attribute information of the respective users relevant to the utilization request.

7. The moving body system according to claim 6, wherein the at least one processor determines the meeting place based on the scheduled working times of a predetermined set of users of the plurality of users, the predetermined set of users being all of the users of the plurality of users except for users which have acquired scheduled working times shorter than a predetermined time.

8. The moving body system according to claim 1, wherein each of the plurality of moving bodies is an autonomous moving vehicle that autonomously moves toward the meeting place without being driven by any of the users, in accordance with a movement command of the one or more operation commands to move to the meeting place.

9. An operation control method for controlling operation of a plurality of moving bodies, the operation control method comprising:
- a step of accepting utilization requests for requesting utilization of the plurality of moving bodies corresponding to respective users in order that the plurality of users gather at a meeting place by using the plurality of moving bodies corresponding to the respective users;
- a step of acquiring scheduled working times of the respective users in the plurality of moving bodies when the respective users move by the plurality of moving bodies corresponding to the users respectively;
- a step of determining the meeting place at which the respective users gather, the meeting place being a location that is closer to a getting-on position of a first user of the users who has a scheduled working time shorter than a scheduled working time of the other users of the users; and
- a step of transmitting one or more operation commands to the plurality of moving bodies, such that the one or more operation commands cause the plurality of moving bodies to travel to the meeting place based on respective getting-on positions of the respective users.

10. The operation control method according to claim 9, wherein:
- in the determining step, the meeting place is determined based on a predetermined location, which is set based on the getting-on positions for the respective users to get on the plurality of moving bodies so that the meeting place is located closer to the getting-on position of the first user as compared with the predetermined location in relation to the first user, and
- the meeting place is located at the position at which the meeting place is more distant from the getting-on position of a second user of the plurality of users as compared with the predetermined location in relation to the second user, who has a longest scheduled working time.

* * * * *